United States Patent

Franzini et al.

Patent Number: 5,256,350
Date of Patent: Oct. 26, 1993

[54] METHOD AND DEVICE FOR MANUFACTURING TIRE FORMING BLADDERS

[75] Inventors: Marco Franzini, Cisterna Di Latina; Fabrizio Giovannucci, Rome; Attilio Pomenti, Rome; Gordon M. Tomlinson, Rome, all of Italy

[73] Assignee: Bridgestone/Firestone, Inc., Akron, Ohio

[21] Appl. No.: 774,752

[22] Filed: Oct. 9, 1991

[30] Foreign Application Priority Data

Nov. 9, 1990 [IT] Italy .................. 67879-A/90

[51] Int. Cl.$^5$ .................. B29C 45/02; B29C 45/16
[52] U.S. Cl. .................. 264/102; 264/513; 264/265; 264/328.3; 264/328.5; 264/328.8; 264/335; 264/257; 425/35; 425/129.1; 425/543; 425/546; 425/557; 425/437; 425/812
[58] Field of Search .......... 425/35, 145, 117, 129.1, 425/543, 812, 120, 116, 546, 557, 437; 264/513, 257, 275, 279, 328.2, 328.3, 265, 328.8, 259, 102, 328.1, 328.4, 328.5, 335

[56] References Cited

U.S. PATENT DOCUMENTS

| | | |
|---|---|---|
| 3,813,197 | 5/1974 | Ray et al. |
| 3,892,512 | 7/1975 | Diehl |
| 4,124,343 | 11/1978 | Makinson et al. .......... 425/145 |
| 4,462,850 | 7/1984 | Fukunaga et al. .......... 425/35 |
| 4,531,902 | 7/1985 | Stuhldreher et al. |
| 4,954,074 | 9/1990 | Cohen |

FOREIGN PATENT DOCUMENTS

| | | |
|---|---|---|
| 58-187332 | 11/1983 | Japan |
| 59-123640 | 7/1984 | Japan |
| 62-263015 | 11/1987 | Japan |
| 63-128919 | 6/1988 | Japan |
| 1159675 | 7/1969 | United Kingdom |
| 1234832 | 6/1971 | United Kingdom |

Primary Examiner—Jeffery Thurlow
Assistant Examiner—Mathieu Vargot
Attorney, Agent, or Firm—Ernst H. Ruf

[57] ABSTRACT

A method and device for manufacturing tire forming bladders (2), whereby a curing mold (3) defines, via first and second half molds (4, 5) and an inner core (6), an inner molding chamber (7) inside which a precured reinforcing ply (72) is optionally inserted; the mold (3) having an outer injection chamber (34) communicating with the inner chamber (7) and consisting of a variable-volume chamber of an injection cylinder (65); the outer chamber (34) being provided with a mass (35) of heated uncured rubber, which is injected into the inner chamber (7) with the mold (3) closed and, when cured, is extracted from the mold (3) by opening the inner chamber (7) and extracting the inner core (6).

11 Claims, 5 Drawing Sheets

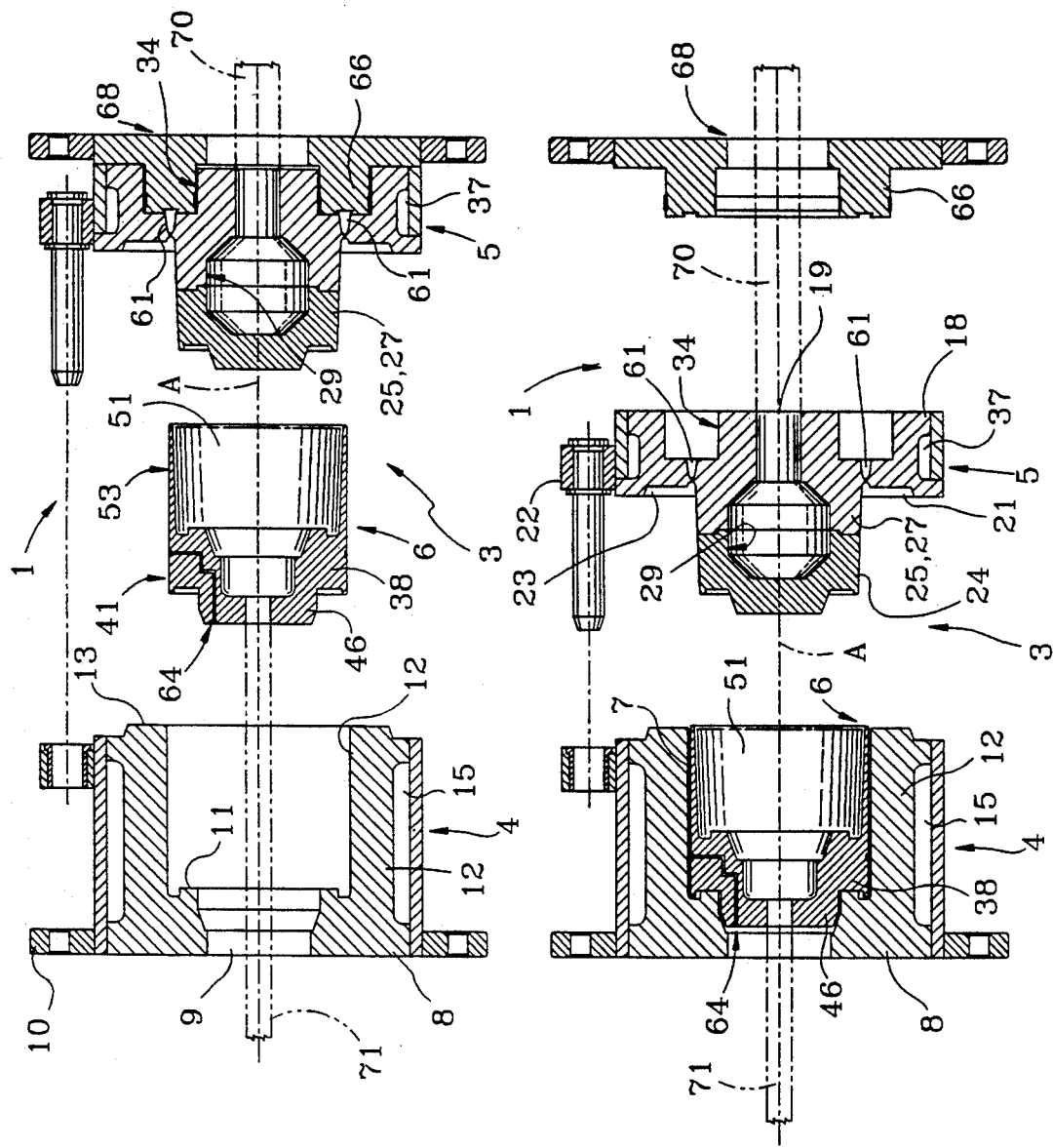

METHOD AND DEVICE FOR MANUFACTURING TIRE FORMING BLADDERS

TECHNICAL FIELD

The present invention relates to a method of manufacturing tire forming bladders.

BACKGROUND OF THE ART

Known tire building drums usually utilize a number of external bladders, which are inflated during manufacture of the tire for preforming the inner carcass and turning the lower sidewall portions of the tire about and over the beads, usually metal beads, secured to the drum by fastening devices on the drum itself.

Due to the mechanical strain they are subjected to and the special function they are called upon to perform, bladders of the aforementioned type are usually, but not necessarily, provided with strengthening or reinforcing plies, and are generally hand made and cured in an autoclave using a relatively time-consuming, high-cost manufacturing process.

SUMMARY OF THE INVENTION

The aim of the present invention is to provide a method of manufacturing tire forming bladders, which provides for reducing manufacturing time and cost while at the same time achieving at least the same precision and reliability of hand made bladders.

With this aim in view, according to the present invention, there is provided a method of manufacturing tire forming bladders, characterized by using a curing mold including first and second half molds and an inner core which, when said curing mold is closed, define an inner molding chamber of the same shape as the bladder being produced; this method comprising steps consisting in feeding a mass of uncured rubber into a chamber outside the mold and communicating with the inner chamber via at least one injection duct; subjecting this mass of uncured rubber, via pressure means and with the mold closed, to sufficient pressure to inject it from the outer chamber into the inner chamber via the injection duct; curing the rubber inside the inner chamber so as to produce a finished bladder; and extracting the finished bladder from the mold by opening the inner chamber and extracting the inner core.

The above method preferably includes a further step consisting of fitting a reinforcing ply onto the inner core, with the mold open; the ply preferably being a rubber-coated ply which is cured prior to being fitted onto the inner core.

According to a preferred embodiment of the above method, the outer chamber is a variable-volume chamber of an injection cylinder; the pressure means consisting of a mobile or movable piston member of the cylinder closing the duct subsequent to injection. According to the above method, the mass of uncured rubber is preferably heated to a predetermined temperature before being injected into the inner chamber.

The above method preferably also includes a further step consisting of creating a vacuum inside the inner chamber prior to injecting the mass of uncured rubber from the outer chamber to the inner chamber.

Finally, the above method preferably includes a further step consisting of blowing air between the inner core and the finished bladder for detaching the bladder from the inner core.

The present invention also relates to a device for manufacturing tire forming bladders. According to the present invention, there is provided a device for manufacturing tire forming bladders, this device being characterized by the fact that it comprises a bladder curing mold which in turn includes mutually-mobile or movable first and second half molds and an extractable inner core, which in combination, when the curing mold is closed, define a substantially toroidal inner molding chamber of the same shape as the bladder; said mold also including an outer chamber designed to receive a mass of uncured rubber; at least one injection duct enabling communication between the inner and outer chambers; and pressure means traveling along the outer chamber for injecting the mass of uncured rubber from the outer chamber of the inner chamber.

BRIEF DESCRIPTION OF THE DRAWINGS

A non-limiting embodiment of the present invention will now be described by way of example with reference to the accompanying drawings, in which:

FIGS. 2 to 6 show schematic axial half sections of the FIG. 1 device in further operating positions.

BEST MODE FOR CARRYING OUT THE INVENTION

Figure 1:
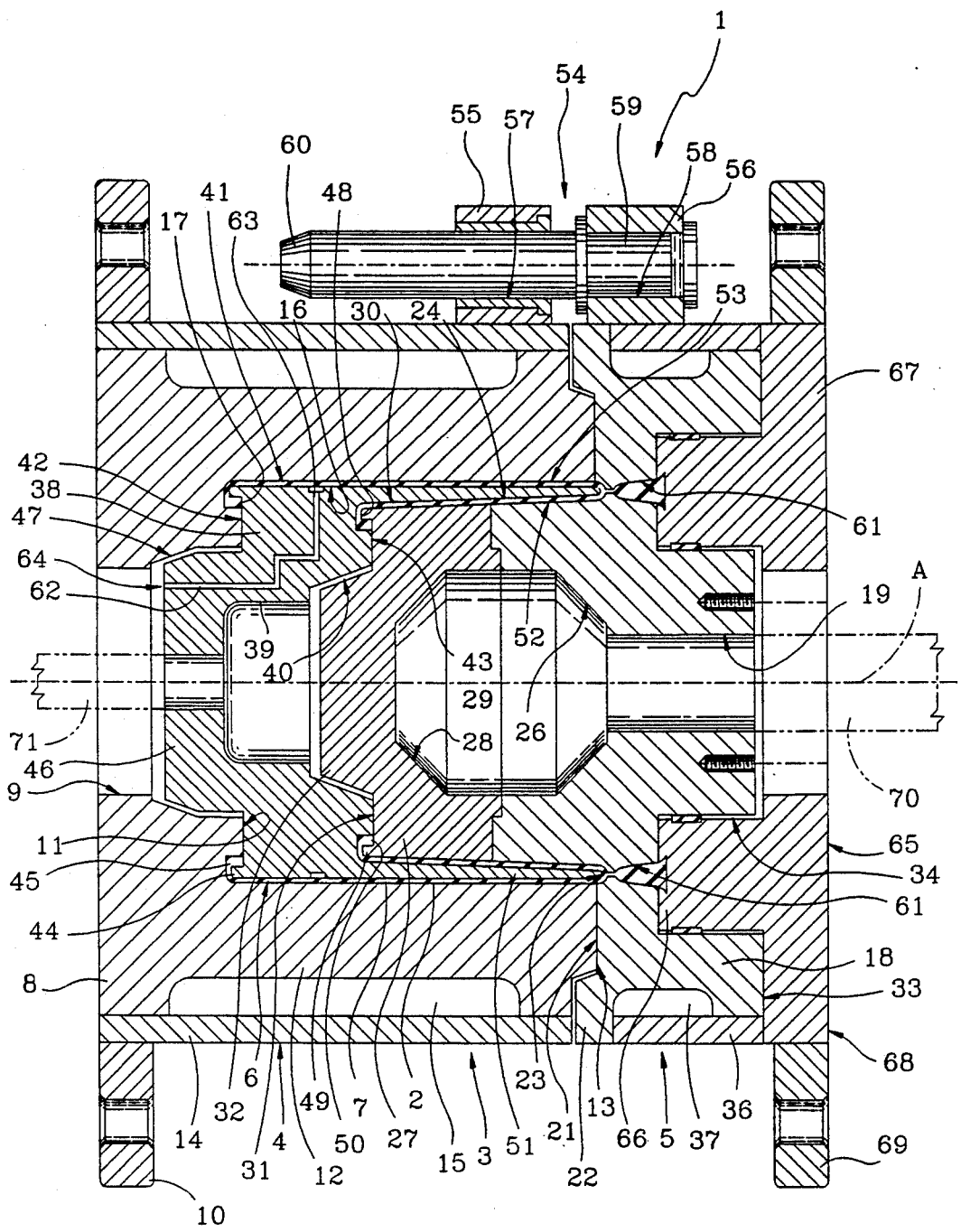
FIG. 1 shows an axial half section of a preferred embodiment of a device in accordance with the present invention in a first operating position.

Number 1 in FIG. 1 indicates a device for manufacturing tire forming bladders 2. Device 1 comprises a substantially cylindrical bladder curing in 3 having a longitudinal axis A, with mold 3 including mutually-mobile or movable first and second half molds 4 and 5 and an extractable inner core 6. Half molds 4 and 5 as well as inner core 6 are all coaxial with axis A and, when mold 3 is closed, define an inner molding chamber 7 coaxial with axis A and substantially the same V shape as bladder 2 which has a pair of generally tapered straight leg portions that join together at one end in an apex as shown in FIG. 1.

As shown in FIG. 1, half mold 4 comprises a substantially cylindrical annular body 8 having a central hole 9 coaxial with axis A and, at one end, an outer flange 10. On the opposite end to flange 10, body 8 includes a flat annular surface 11 and an annular appendix or extension 12 coaxial with axis A, extending from the outer periphery of surface 11 towards half mold 5, and having its free end defined by a flat annular surface 13.

The outer peripheral surface of extension 12 includes an annular groove closed externally by a liner or cover 14 defining a duct 15 for circulating a heat exchange fluid. Extension 12 is defined internally by a cylindrical surface 16 blending at one end with surface 11 via an annular groove 17, so as to define a first outer surface portion of inner chamber 7.

As also shown in FIG. 1, half mold 5 comprises a substantially cylindrical annular body 18 having a central hole 19 coaxial with axis A and, on the end facing half mold 4, a flat annular surface 21 and an axial annular appendix or extension 22 coaxial with axis A and extending from the outer periphery of surface 21 towards half mold 4. When mold 3 is closed, extension 22 fits onto an end portion of extension 12, while surface 21 contacts or mates with surface 13 of half mold 4.

The inner periphery of surface 21 is defined by an annular groove 23 blending surface 21 with an outer truncated-cone surface 24 of a tubular extension 25 coaxial with axis A, extending from a central portion of body 18 towards half mold 4 and inside appendix 12, and having an axial cavity 26 coaxial with axis A and communicating with hole 19. The free end of extension 25 is integrally fitted with a plate 27 having, on the side facing extension 25, a cavity 28 defining, with cavity 26, an inner cavity 29 coaxial with axis A and communicating externally via hole 19.

Plate 27 is defined externally by a truncated-cone surface 30 constituting an extension of surface 24 and defining, with surface 24 and groove 23, an outer surface portion of inner chamber 7 facing and extending inside surface 16. Plate 27 is also defined, on its free end, by a flat annular surface 31, from the inner periphery of which a truncated-cone appendix 32, coaxial with axis A, projects towards body 8.

The annular end surface 33 of body 18, opposite surface 21, includes an annular front groove defining an annular outer chamber 34 coaxial with axis A and designed to receive a toroidal body 35 (FIG. 5) consisting of a mass of uncured rubber.

The lateral outer surface of body 18 includes an annular groove closed externally by a liner 36 defining a duct 37 for circulating a heat exchange fluid.

As shown in FIG. 1, inner core 6 includes an annular central portion 38 having a central hole 39 having a truncated-cone portion 40 engaged by truncated-cone extension 32. Central portion 38 is defined laterally by a cylindrical surface 41 and, at the ends, by two flat annular surfaces 42 and 43 coaxial with and perpendicular to axis A.

Surface 42 is arranged for contacting surface 11 of body 8, and is defined outwardly by an axial annular rib 44 extending inside groove 17 so as to define, with same, a channel for forming a first expansion or annular end foot or bead position 45 of bladder 2. Surface 42 is defined inwardly by a tubular axial appendix or extension 46 extending towards body 8 and having a substantially truncated-cone outer surface 47 engaging a truncated-cone portion of hole 9.

Figure 5:
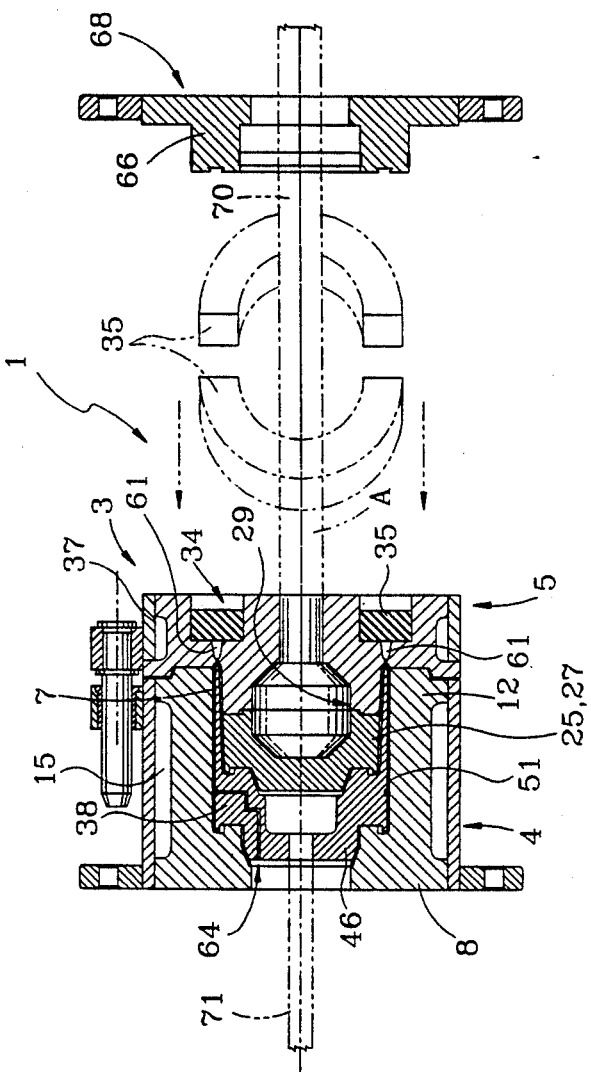

Surface 43 is defined inwardly by surface 40 and outwardly by an annular groove 48 engaged by an annular rib 49 extending axially from the outer periphery of surface 31, so as to define, inside groove 48, a channel for forming a second expansion or annular end foot or bead portion 50 of bladder 2. Groove 48 blends surface 43 with the surface of a thin-walled tubular appendix or extension 51 extending from body 38 towards half mold 5. In particular, when mold 3 is closed, appendix 51 extends between surface 16 on one side and surfaces 24 and 30 on the other, with its free end engaging groove 23. Appendix 51 is defined internally by a truncated-cone surface 52 parallel to the truncated-cone surface consisting of surfaces 24 and 30, and defining a first inner surface portion of chamber 7; and externally by a cylindrical surface 53 identical to and coaxial with surface 41, which defines, with surface 53, a second inner surface portion of chamber 7 facing surface 16, provided chamber 7 with a pair of generally straight tapered leg portions that merge into an apex at annular groove 23 to form the V-shaped configuration of chamber 7 as shown in FIGS. 1 and 5.

Half molds 4 and 5 include an external guide device 54 comprising a number of pairs of radial outer brackets 55 and 56 (only one pair of which is shown) facing each other and having respective axial holes 57 and 58. Each hole 58 houses an axially-locked end spigot 59 of a pin 60 parallel to axis A and engaging hole 57 of respective bracket 55 in sliding manner when mold 3 is closed.

As shown in FIG. 1, the end surface of outer chamber 34 has a number of injection ducts 61 enabling communication between outer chamber 34 and inner or molding chamber 7 at the end of groove 23.

Appendix or extension 46 and portion 38 of inner core 6 include a number of substantially axial through holes 62 (only one of which is shown), the substantially radial end portion of each of which presents an outlet 63 on surface 41. Holes 62 define the end portion of an air injection-suction device indicated as a whole by numeral 64.

According to a variation not shown, appendix 46 and intermediate portion 38 of inner core 6 present a first and second number of holes 62, one defining the end portion of a compressed air injection device and the other a suction device.

As shown in FIG. 1, outer chamber 34 is a variable-volume chamber of an injection cylinder indicated as a whole by 65 and the piston portion of which is defined by an annular appendix 66 coaxial with axis A and chamber 34, and projecting towards half mold 5 from an annular plate 67 of a mobile or movable annular member 68. Member 68 includes an outer flange 69 normally connected to a movable element (not shown) on a press (not shown), the fixed plate of which (not shown) is fitted with flange 10 of half mold 4.

Operation of device 1 will now be described commencing from the FIG. 2 operating position, wherein mobile or movable member 68 is in the back-up or rest position, mold 3 is open with half mold 5 backed up by a movable control rod 70 and contacting mobile member 68, and inner core 6 is located by a movable control rod 71 halfway between half molds 4 and 5.

Commencing with the above setup, there are two ways in which bladder 2 can be formed, depending on whether or not it includes a reinforcing ply 72 as shown in FIG. 7. If no reinforcing ply 72 is required, rod 71 is operated axially for inserting inner core 6 (FIG. 3) inside the cavity of half mold 4 defined by body 8 and appendix 12. If, on the other hand, a ply 72 is required, prior to inserting inner core 6 inside said cavity, ply 72 is fitted onto the peripheral surface of appendix 51 thus contacting surface 41 of portion 38 of inner core 6.

Figure 7A:
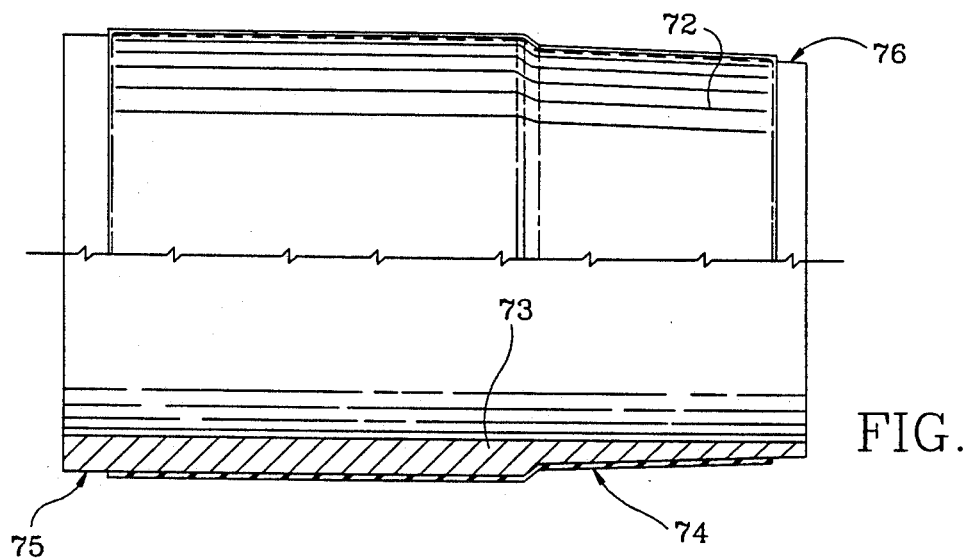
FIGS. 7a-7c show a schematic axial half section of three successive steps of a subprocess performed between the FIG. 2 and 3 stages.
Figure 7B:
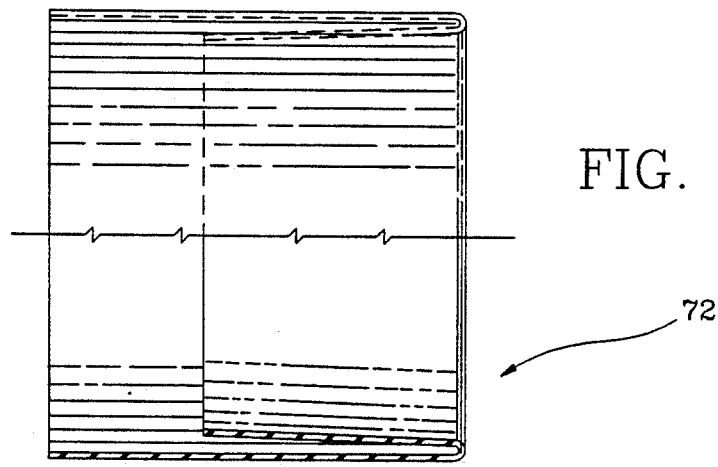
Figure 7C:
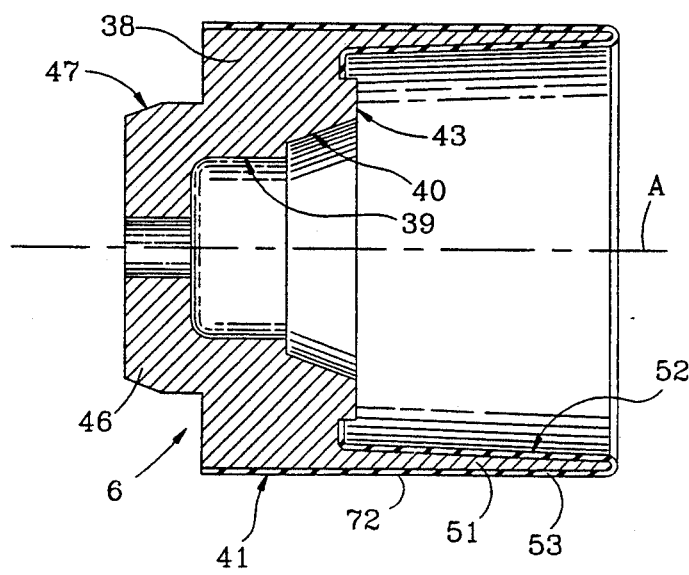

As shown in FIG. 7, ply 72, which is normally rubber-coated and reinforced internally with yarn or fabric (not shown) is previously formed separately using a tubular core 73. The outer surface 74 of core 73, on which ply 72 is originally formed, has a cylindrical surface 75 identical to surfaces 41–53, and a truncated-cone surface 76 identical to surface 52 but tapering the opposite way. Once formed (FIG. 7a), ply 72, after being partially stabilized by curing, is removed from core 73, and folded (FIG. 7b) into a substantially V-shaped section before being fitted onto inner core 6 (FIG. 7c).

Figure 4:
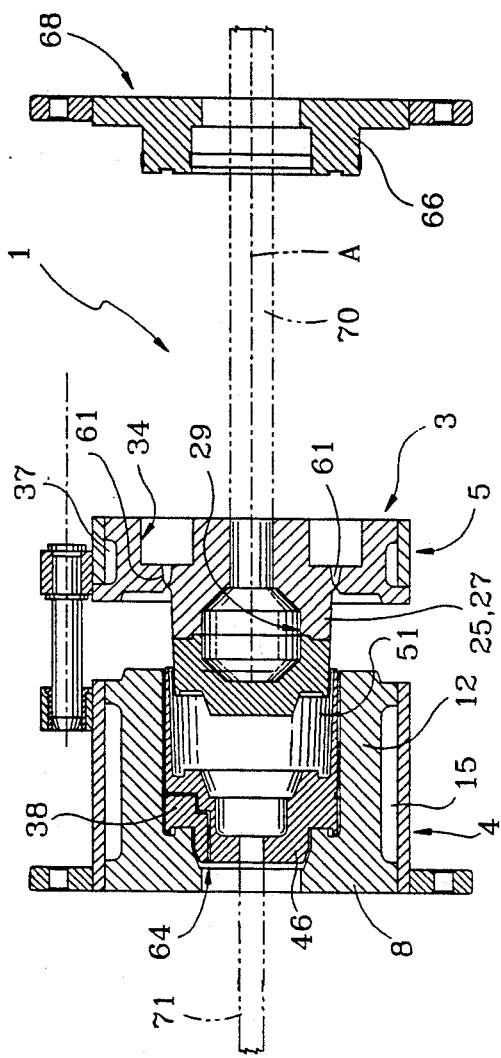

As shown in FIGS. 3 and 4, as core 6 is inserted inside half mold 4, control rod 70 is operated so as to unite half mold 5 with half mold 4 with appendix 25–27 inside the cavity defined by appendix 51 and intermediate body 38 of core 6, so as to define inner chamber 7 together with half mold 4 and inner core 6.

At this time, body 35 of uncured rubber, which, as shown in FIG. 5, normally consists of two semiannular bodies, is inserted inside chamber 34 after first being heated to a predetermined temperature in an oven (not shown), and the press (not shown), between whose movable, and fixed elements (not shown) device 1 is mounted, is closed so as to engage appendix or piston portion 66 of mobile member 68 gradually inside chamber 34, and inject the uncured rubber of body 35 from outer chamber 34 into inner chamber 7 through injection ducts 61.

Injection of the uncured rubber of body 35 inside chamber 7 is assisted by producing a vacuum inside chamber 7 via device 64. By the time mobile member 68 reaches the foremost limit position shown in FIG. 1, all the rubber of body 35 has been injected inside mold 3 so as to fill chamber 7 and form bladder 2, and ducts 61 are closed by appendix 66 contacting the inner end surface of outer chamber 34.

At this time, heat exchange fluid is circulated along ducts 15 and 37 and inside both inner core 6 and cavity 29, so as to cure bladder 2 relatively quickly, due to the relatively high initial temperature of the uncured rubber being injected into chamber 7. Moreover, as the shape and volume of chamber 7 remain unchanged during injection, the injected rubber occupies the full volume of chamber 7, thus producing a bladder 2 with an excellent surface finish and accurately reproducing the shape of chamber 7.

Figure 6:
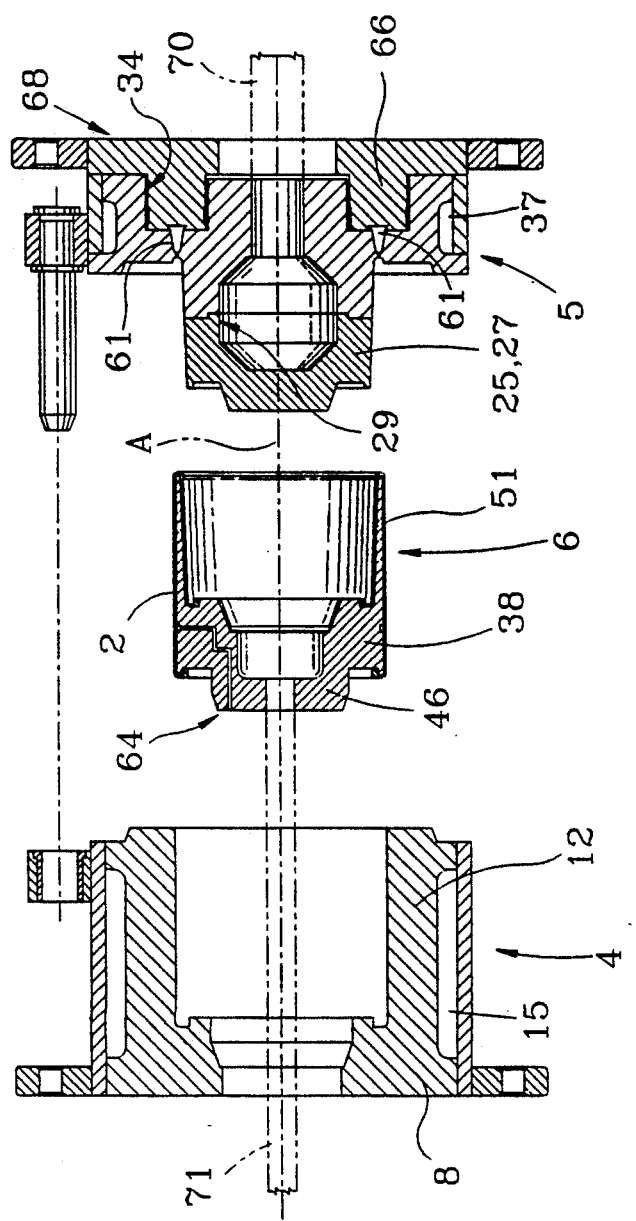

After curing, the press (not shown) is opened and, as shown in FIG. 6, rod 70 is operated for withdrawing mobile member 68 and half mold 5 from half mold 4 and so opening mold 3. At this time (FIG. 6), rod 71 is operated for extracting inner core 6 and finished bladder 2 from half mold 4, and air is blown by device 64 between bladder 2 and inner core 6 for detaching bladder 2 from core 6.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. A method of manufacturing tire forming bladders having a general V-shaped cross sectional configuration formed by a pair of generally straight tapered leg portions which join at one end to form an apex of the V-shaped bladder, including the steps of, providing a curing mold having first and second half molds and an inner core; inserting a first end of the inner core into an opening formed in the first half mold to form a first generally straight tapered leg portion of a substantially V-shaped inner molding chamber; inserting the second half mold into an opening formed in the inner core of form an annular groove and a generally straight tapered second leg portion of said molding chamber therebetween, with said second leg portion joining with the first leg portion at said annular groove; feeding a mass of uncured rubber into an annular outer chamber formed on the outside of the second half mold which communicates with the annular groove of said inner molding chamber via a number of injection duct means arranged in a generally circular pattern in said outer chamber; moving an annular piston into the annular outer chamber of the second mold half after said second mold half is inserted into the inner core and subjecting said mass of uncured rubber to sufficient pressure to inject said uncured rubber from said outer annular chamber into the annular groove of said inner chamber via said injection duct means whereby the uncured rubber flows into the annular groove and then into the straight tapered leg portions of the inner molding chamber communicating therewith to form the V-shaped bladder; curing said rubber inside said inner chamber so as to produce a finished bladder; and extracting said finished bladder from said mold by removing said second half mold from the inner core and extracting said inner core from the first half mold.

2. A method as claimed in claim 1 including the step of fitting a reinforcing ply onto said inner core with said mold open.

3. A method as claimed in claim 2 in which said ply is a rubber-coated ply which is cured before being fitted onto said inner core.

4. A method as claimed in claim 1 in which said outer chamber is a variable-volume chamber of an injection cylinder; and in which said pressure means consists of a movable piston portion in said cylinder and closes said injection duct means subsequent to injection of the uncured rubber into the annular groove of the inner molding chamber.

5. A method as claimed in claim 1 including heating said mass of uncured rubber to a predetermined temperature before being injected inside said inner chamber.

6. A method as claimed in claim 1 including a further step consisting of producing a vacuum inside said inner chamber before injecting said mass of uncured rubber from said outer chamber into said inner chamber.

7. A method as claimed in claim 6 including a further step consisting of blowing air between said inner core and said finished bladder for detaching said bladder from said inner core.

8. A device for manufacturing a tire forming bladder having a V-shaped cross sectional configuration formed by a pair of straight tapered legs terminating at one end in an apex; said device including a bladder curing mold having mutually movable first and second half molds and an extractable inner core, a first end of said inner core being inserted into an opening formed in the first half mold to form a first straight tapered leg portion of a substantially V-shaped inner molding chamber therebetween, with said second half mold being inserted into an opening formed in a second end of the inner core to form an annular groove and a second straight tapered leg portion of said molding chamber therebetween, with said second leg portion joining with the first leg portion of the molding chamber at said annular groove; an annular outer chamber formed on the outside of the second half mold for receiving a mass of uncured rubber; a number of injection duct means formed in the second half mold and arranged in a generally circular pattern and communicating between said annular groove of the inner molding chamber and the outer chamber; and pressure means traveling along said outer chamber for injecting said mass of uncured rubber from said outer chamber into the annular groove of said inner chamber and the outer for injecting said mass of uncured rubber from said outer chamber into the annular groove of said inner chamber through said number of duct means for subsequent flow into the first and second straight tapered leg portions of the inner chamber.

9. A device as claimed in claim 8 in which said outer chamber is a variable-volume chamber of an injection cylinder; and in which said pressure means includes a movable piston portion in said cylinder.

10. A device as claimed in claim 8 including injection means for blowing air into said inner chamber; and in which the said injection means is connected with said inner chamber through said inner core.

11. A device as claimed in claim 8 including a suction means for withdrawing air from said inner chamber; and in which said suction means is connected with said inner chamber through said inner core.

* * * * *